(12) United States Patent
Chen

(10) Patent No.: US 9,507,985 B2
(45) Date of Patent: Nov. 29, 2016

(54) OPTICAL LENS FOR USING IN ILLUMINATION SYSTEM OF IMAGING SCANNER

(71) Applicant: SYMBOL TECHNOLOGIES, INC., Schaumburg, IL (US)

(72) Inventor: Caihua Chen, Albany, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 286 days.

(21) Appl. No.: 14/230,441

(22) Filed: Mar. 31, 2014

(65) Prior Publication Data

US 2015/0278567 A1    Oct. 1, 2015

(51) Int. Cl.
*G06K 7/10*    (2006.01)

(52) U.S. Cl.
CPC ....... *G06K 7/10732* (2013.01); *G06K 7/10722* (2013.01); *G06K 7/10831* (2013.01)

(58) Field of Classification Search
USPC .................................................... 235/462.42
See application file for complete search history.

(56) References Cited

U.S. PATENT DOCUMENTS

| | | | |
|---|---|---|---|
| 5,733,710 A | 3/1998 | Kuboya | |
| 6,105,869 A | 8/2000 | Scharf et al. | |
| 6,989,932 B2 | 1/2006 | Cho | |
| 7,033,736 B2 | 4/2006 | Morris | |
| 7,330,311 B2 | 2/2008 | Soyama | |
| 7,821,715 B2 | 10/2010 | Suzuki | |
| 7,835,079 B2 | 11/2010 | El-Ghoroury | |
| 8,085,295 B2 | 12/2011 | Tobiason | |
| 8,237,891 B2 | 8/2012 | Watanabe | |
| 8,498,505 B2 | 7/2013 | Moore | |
| 2010/0079861 A1* | 4/2010 | Powell | G02B 27/0081 359/449 |
| 2012/0244910 A1* | 9/2012 | Hsu | G03B 21/10 455/566 |
| 2013/0200155 A1* | 8/2013 | Weber | G06K 7/10722 235/454 |

FOREIGN PATENT DOCUMENTS

| | | |
|---|---|---|
| EP | 911676 B1 | 10/2004 |
| EP | 2075630 A1 | 7/2009 |
| EP | 2423717 A3 | 12/2012 |
| WO | 9102380 A1 | 2/1991 |

OTHER PUBLICATIONS

International Search Report and Written Opinion mailed May 26, 2015 in counterpart PCT application PCT/US2015/021420.

* cited by examiner

*Primary Examiner* — Michael G Lee
*Assistant Examiner* — David Tardif

(57) ABSTRACT

An imaging scanner includes an illumination light source and a hybrid illumination lens. The hybrid illumination lens includes a first Fresnel surface facing the illumination light source and a second surface having a microlens array thereon. The first Fresnel surface is configured to direct light received from the illumination light source towards the second surface to generate illumination light towards a target object through the microlens array on the second surface.

18 Claims, 8 Drawing Sheets

US 9,507,985 B2

OPTICAL LENS FOR USING IN ILLUMINATION SYSTEM OF IMAGING SCANNER

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

Imaging-based bar code readers may be portable or stationary. A portable bar code reader is one that is adapted to be held in a user's hand and moved with respect to target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
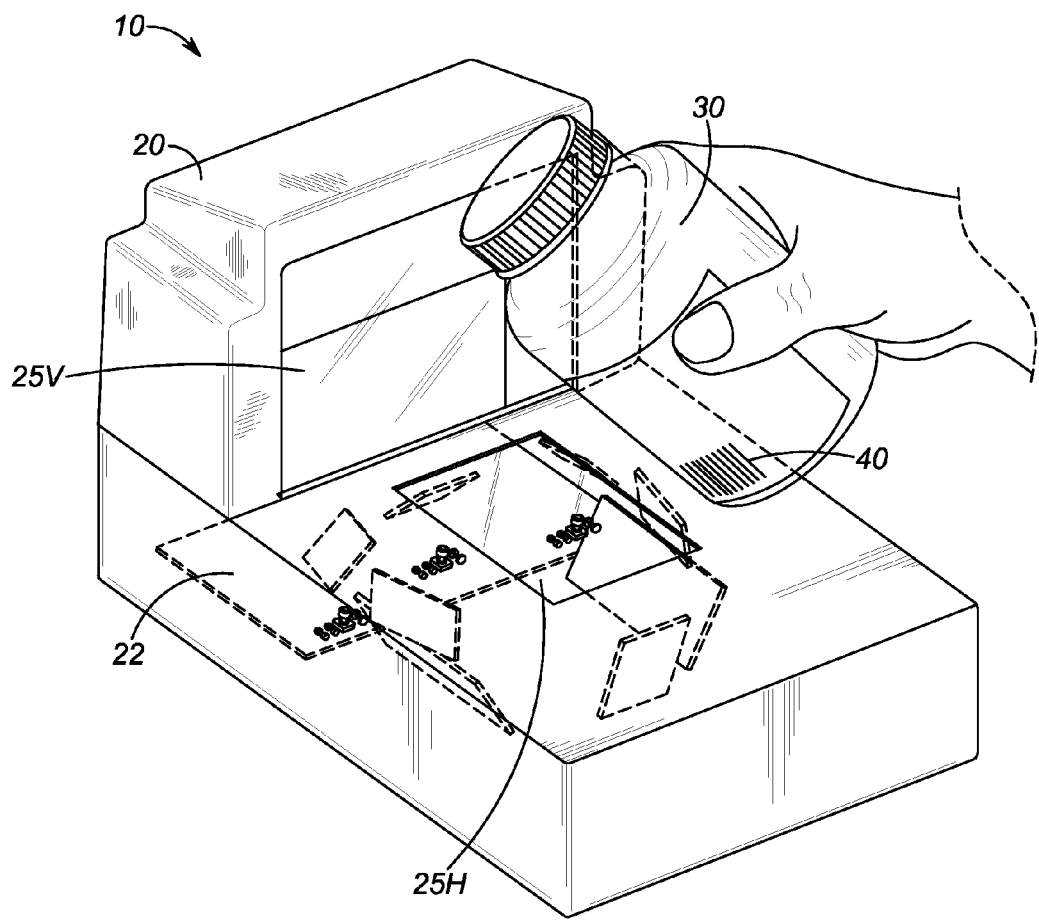
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An imaging scanner includes an illumination light source, an illumination lens, an imaging lens arrangement, an imaging sensor, and a controller. The illumination lens includes a first Fresnel surface facing the illumination light source and a second surface having a microlens array thereon. The first Fresnel surface is configured to direct light received from the illumination light source towards the second surface to generate illumination light towards a target object through the microlens array on the second surface. The illumination light has a predetermined illumination field of view. The imaging sensor has photosensitive elements configured to detect light from the target object within an imaging field of view through the imaging lens arrangement at least during a time period when the target object is illuminated by the illumination light. The imaging sensor is configured to output image data from the photosensitive elements. The controller is configured for processing the image data to decode an image of a barcode on the target object.

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register 48, a touch screen visual display, a printer for generating sales receipts, or other type user interface. The workstation often includes weighing scale 46 incorporated within the housing 20. A horizontal platter 26 is coupled with the weighing scale 46 for weighing a product placed on the horizontal platter 26. The workstation 10 can be used by retailers to process transactions involving the purchase of products bearing an identifying target, such as UPC symbols.

In accordance with one use, an operator can slide or swipe the product 30 past one of the windows (e.g., 25H or 25V) from right to left, or from left to right, in a "swipe" mode, to let an image of the barcode 40 on the product 30 be captured by the workstation 10. Alternatively, the operator can present the barcode 40 on the product 30 to the center of the window 25V in a "presentation" mode. The choice depends on operator preference or on the layout of the workstation. Upon a successful reading of the target bar code, a visual and/or audible signal will be generated by the workstation 10 to indicate to the user that the target bar code 40 has been successfully imaged and decoded.

Figure 2A:
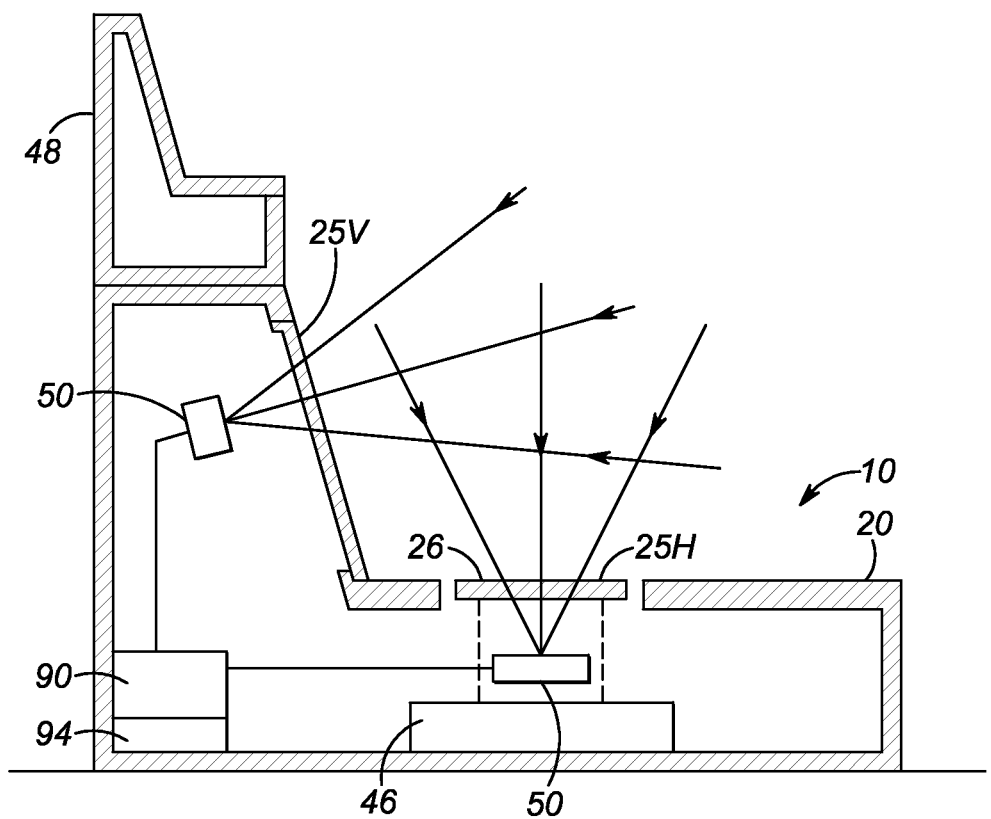
FIG. 2A is a schematic of a multi-planer workstation that includes a plurality of solid-state imagers in accordance with some embodiments.
Figure 2B:
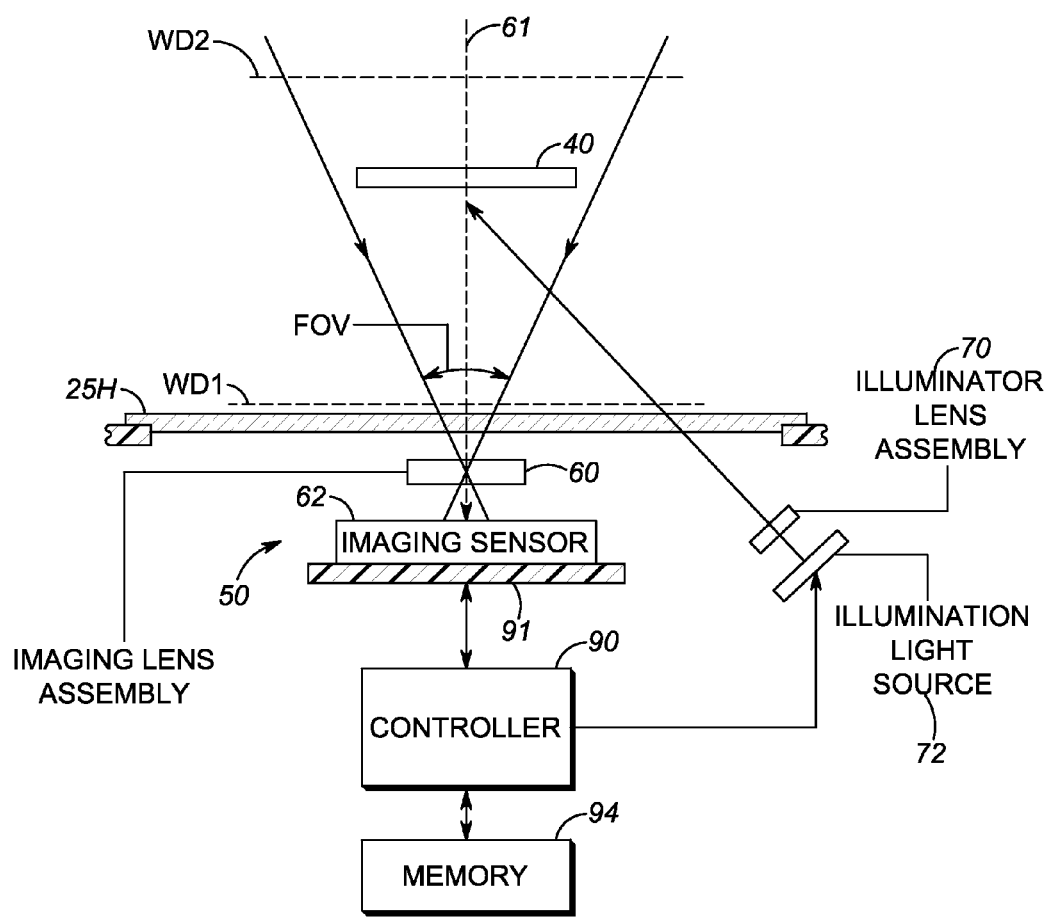
FIG. 2B is a schematic of an imaging scanner in accordance with some embodiments.

As schematically shown in FIG. 2A, a plurality of imaging scanners 50 are mounted at the workstation 10, for capturing light passing through either or both windows from a target which can be a one- or two-dimensional symbol, such as a two-dimensional symbol on a driver's license, or any document, as described below. FIG. 2B is a schematic of an imaging scanner 50 in accordance with some embodiments. The imaging scanner 50 in FIG. 2B includes the following components: (1) an imaging sensor 62 positioned behind an imaging lens arrangement 60; (2) an illuminating lens arrangement 70 positioned in front of an illumination light source 72; and (3) a controller 90.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 25H (or 25V). Generally, the imaging sensor 62 and the imaging lens arrangement 60 are designed to operate together for capturing light scattered or reflected from a barcode 40 as image data over a two-dimensional imaging field of view (FOV). The barcode 40 generally can be located anywhere in a working range of distances between a close-in working distance (WD1) and a far-out working distance (WD2).

In FIG. 2B, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources.

In FIG. 2B, the controller 90, such as a microprocessor, is operatively connected to the imaging sensor 62 and the illumination light source 72 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as image data. Such image data is digitally processed by the decoder in the controller 90 to decode the barcode. The information obtained from decoding the barcode 40 is then stored in the memory 94 or sent to other devices for further processing.

Image-Based Barcode Scanner typically requires high power visible LED to provide illumination to read barcode independent of environment and barcode orientation. The bright illumination has been causing big discomfort to users. This disclosure proposes a compact Illumination design approach to provide great eye comfort while meeting the desired signal and field of view requirements for barcode reading.

One known approach to improve the eye discomfort from the bright LED illumination in image-based barcode reader is to use diffuser to soften the crispy LED chip image and lower the light intensity. Unfortunately this is achieved with the sacrifice of the scanner performance and the higher power consumption due to the power loss from the nature of light diffuser. It is often very challenging if not impossible to meet the performance requirement and in the meantime to provide acceptable eye comfort.

In this disclosure, the illumination system includes a hybrid optical lens combing the first Fresnel surface and the second micro-lens array surface to significantly broaden and uniform the chip image in the users' eye, namely the apparent light source, to provide great eye comfort and in the meantime efficiently meeting the desired signal level, uniformity and field of view requirements for barcode reading with minimum power loss and thus optimal power consumption.

Figure 3:
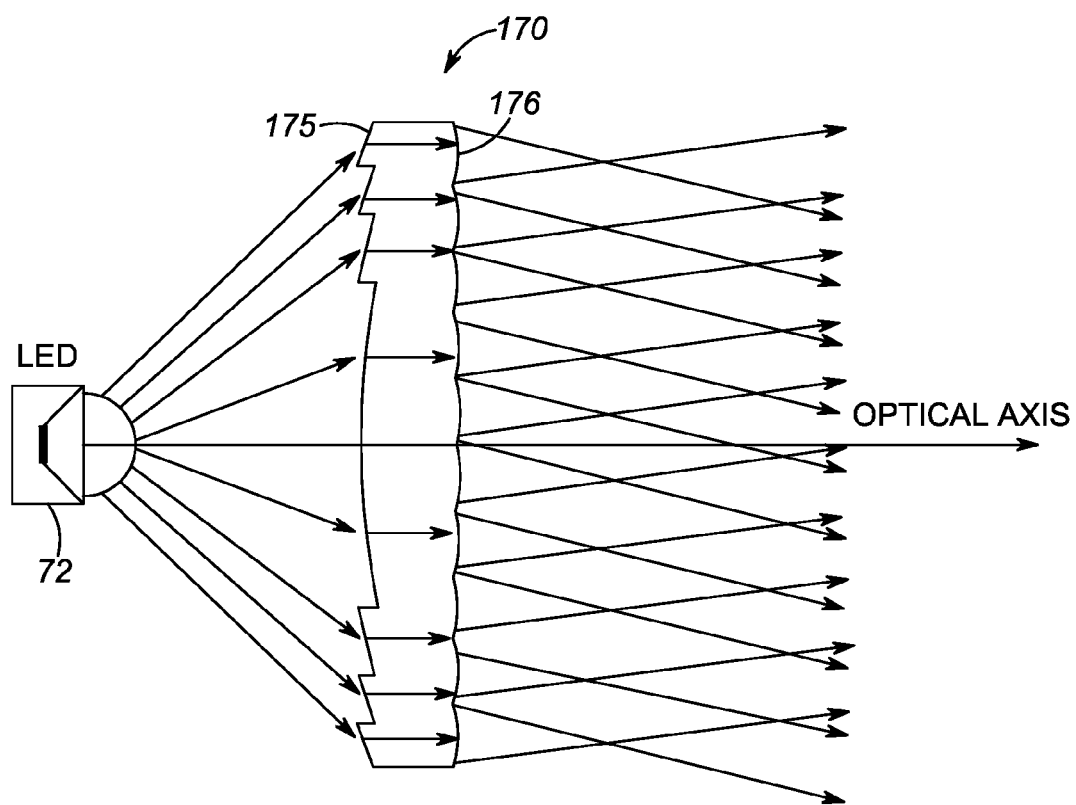
FIG. 3 is a schematic of a compact hybrid optical lens that has the first Fresnel surface and the second microlens array surface in accordance with some embodiments.

FIG. 3 is a schematic of a compact hybrid optical lens 170 that has the first Fresnel surface 175 and the second micro-lens array surface 176. The compact hybrid optical lens 170 can be used as a component of the illuminator lens assembly 70 of FIG. 2. As illustrated in FIG. 3, the first Fresnel surface 175 collimates the divergent beam from the LED source 72. And subsequently each micro-lens on the second microlens array surface 176 efficiently directs all the rays captured and collimated by the fresnel surface 175 to the desired field of view. In some implementations, all the microlenses have substantially the same field of view and they all overlap at the farfield to create the uniform illumination pattern with the shape and the aspect ratio same as the individual microlens.

Figure 4:
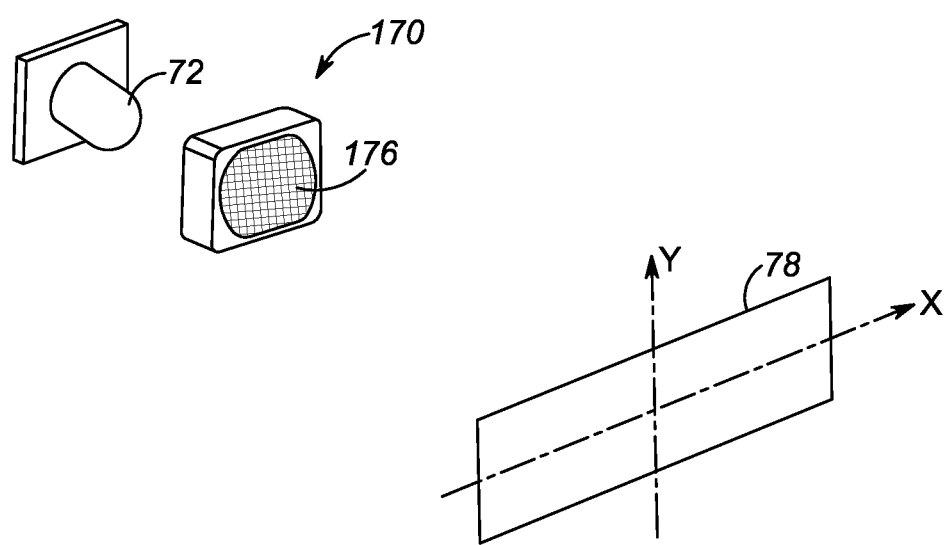
FIGS. 4-5 are schematics of the illumination system for generating the illumination field of view in accordance with some embodiments.
Figure 5:
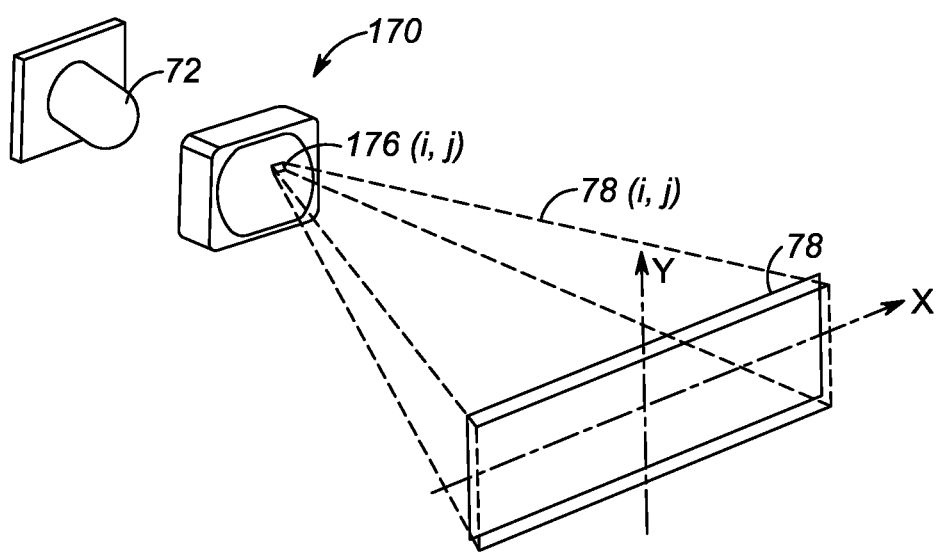

In some embodiments, as shown in FIGS. 4-5, the size of the illumination pattern 78, namely the illumination field of view, is simply determined by the X, Y dimensions and the focal length of each microlens, such as, 176($i, j$). For instance, if the individual microlens has a rectangular shape with a focal length of F and X, Y dimensions of Dx and Dy, the resulted illumination pattern would have a rectangular shape with the aspect ratio of Dx/Dy and the X and Y FOVs of Dx/F and Dy/F respectively. In contrary to the traditional illumination design approach which uses complicated optical lens(es) to skew rays to achieve the desired shape, size, and aspect ratio of illumination pattern, an illuminator lens assembly 70 that includes the compact hybrid optical lens 170 can be much more flexible, more efficient, and cost effective by simply controlling the shape of the individual microlens, its X, Y dimensions and its focal length. Most importantly, in this design approach the apparent light source has a size of the collecting aperture of the Fresnel surface, which can be designed to be significantly larger than the virtual chip image of the LED source by adjusting the distance between the LED source 72 and the fresnel surface 175 and therefore largely improve the eye comfort. Moreover, this design approach decouple the complicate design problem, which involves very challenging optical ray skewing for converting the divergent LED source to the desired illumination pattern, into two simplified steps involving only on-axis design, which enables more efficient design in terms of throughput and illumination pattern quality.

Figure 6A:
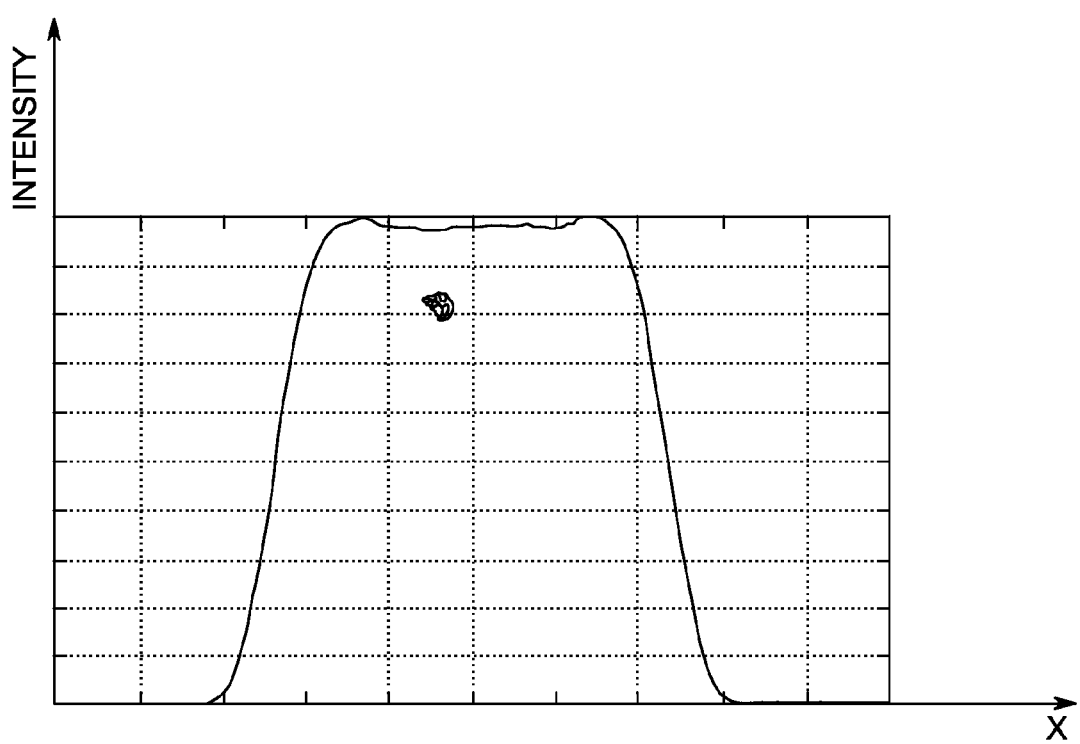
FIG. 6A and FIG. 6B are respectively the X-scan intensity profile and the Y-scan intensity profile of the illumination field of view in accordance with some embodiments.
Figure 6B:
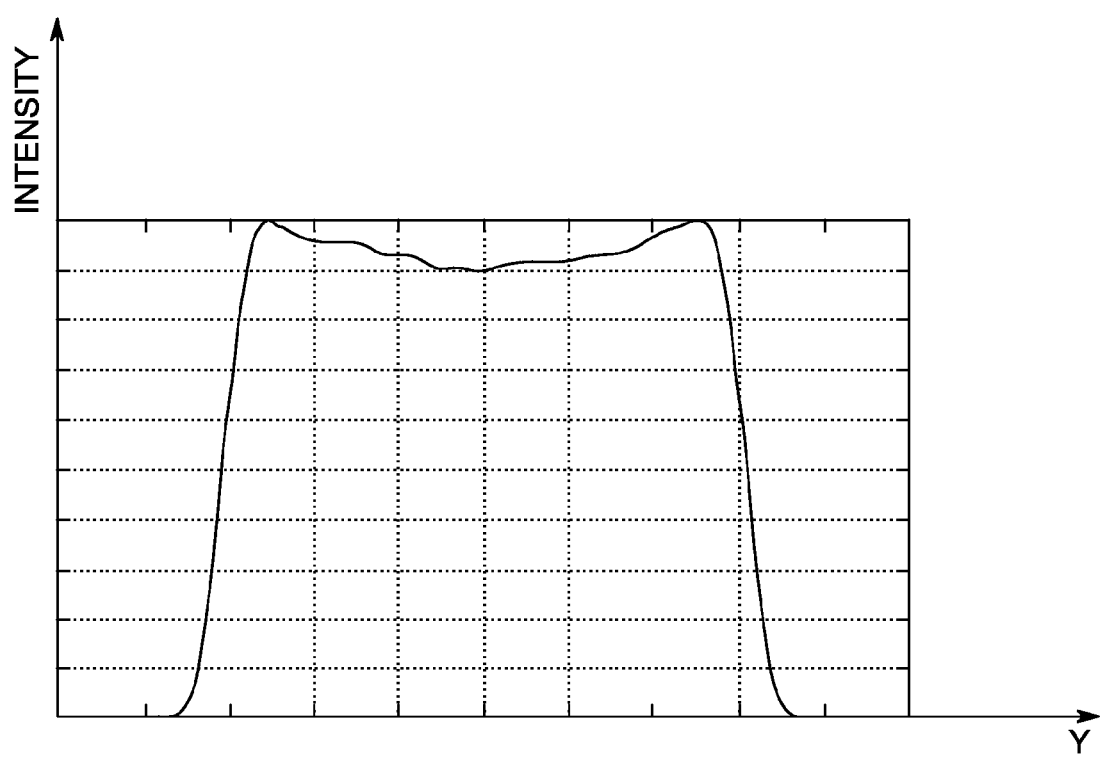

In one embodiment of the compact hybrid optical lens 170 for improving the eye comfort, the power efficiency, and the uniformity of the current bioptic product. In this embodiment, the fresnel surface 175 has a focal length of 30.5 mm; the microlens array has 30×60 rectangular micro lenses with each micro lens having a focal length of 3 mm and X and Y dimensions of 2 mm and 1 mm respectively, which gives a field of view of ~38°×18° required by the vertical side field of view based on the optical layout of our current bioptics product. This design of the compact hybrid optical lens 170 can has the apparent light source size of about 50 mm, as observed by a user, that is more than 25 times larger than the current eye annoying design used in current bioptics product on traditional illumination design approach that may have an apparent light source size smaller than 2 mm. FIG. 6A shows the X-scan intensity profile with the desired X field of view of ~38°. FIG. 6B shows the Y-scan intensity profile with the desired Y field of view of ~18°

Compared to the traditional illumination design approach which uses complicated optical lens or lenses to skew rays to achieve the desired shape, size, and aspect ratio of illumination pattern and then uses the diffusers to improve eye comfort, the compact hybrid optical lens 170 as shown in FIG. 3 offers many advantages. First, it enables design with significantly improved eye comfort. For instance, in some embodiments, it is possible to achieve 25 times eye perception improvement from the current design used in some barcode imagining scanner products based on the traditional approach. Second, the compact hybrid optical lens 170 as shown in FIG. 3 allows higher power efficiency since it directs all the rays captured and collimated by the fresnel surface to the desired field of view. Third, this approach offers a simple but efficient way to control the shape, size, aspect ratio and uniformity of the resulted illumination pattern.

This idea can be used to solve the eye annoyance problem in our current bioptics product with improved power efficiency and illumination pattern quality. It can be also used in all other image based barcode reading Engine and/or Scanner for improving eye comfort, power efficiency, and illumination pattern quality.

In one aspect, this disclosure is directed to an apparatus that includes an illumination light source, an illumination lens, an imaging lens arrangement, an imaging sensor, and a controller. The illumination lens includes a first Fresnel surface facing the illumination light source and a second surface having a microlens array thereon. The first Fresnel surface is configured to direct light received from the illumination light source towards the second surface to generate illumination light towards a target object through the microlens array on the second surface. The illumination light has a predetermined illumination field of view. The imaging sensor has photosensitive elements configured to detect light from the target object within an imaging field of view through the imaging lens arrangement at least during a time period when the target object is illuminated by the illumination light. The imaging sensor is configured to output image data from the photosensitive elements. The controller is configured for processing the image data to decode an image of a barcode on the target object.

In some implementations, the illumination light source can be located at a focus position of the first Fresnel surface to climate light from the illumination light source towards the second surface of the illumination lens. In some implementations, the illumination light source can be configured to climate light from the illumination light source towards the second surface of the illumination lens. In some implementations, the first Fresnel surface can have a focus length that is between 10 mm and 60 mm.

In some implementations, the microlens array can be arranged in a matrix of M rows and N columns. In some implementations, the microlens array can be arranged in other regular or irregular patterns. In some implementations, the integer M can be at least 20 and the integer N can also be at least 20. In some implementations, at least one of the integer M and the integer N is larger 50.

In some implementations, the microlens array includes at least 200 micro lenses each having a focus length that is between 1 mm and 6 mm. In some implementations, the microlens array includes at least 200 micro lenses each having a focus length that is between 2 mm and 4 mm. In some implementations, at least 200 micro lenses in the microlens array are rectangular in shape.

In some implementations, the microlens array includes at least 200 micro lenses each projecting light received from the first Fresnel surface into a corresponding field of view that is rectangular in shape. In some implementations, the microlens array can include includes at least 400, least 800, or 1200 such micro lenses. In some implementations, the predetermined illumination field of view is rectangular in shape.

In some implementations, the microlens array includes at least 200 micro lenses wherein multiple micro lenses each project light received from the first Fresnel surface into a corresponding field of view that overlaps with the predetermined illumination field of view by at least 90%. In some implementations, the microlens array can include includes at least 400, least 800, or 1200 such micro lenses.

In some implementations, the microlens array includes at least 200 micro lenses wherein multiple micro lenses each project light received from the first Fresnel surface into a corresponding field of view that is substantially within with the predetermined illumination field of view. In some implementations, the microlens array can include includes at least 400, least 800, or 1200 such micro lenses.

In one aspect, this disclosure is directed to a method that includes (1) projecting light from an illumination light source onto a first Fresnel surface of an illumination lens and (2) directing the light received from the illumination light source by the first Fresnel surface towards a second surface of the illumination lens to generate illumination light towards a target object through a microlens array on the second surface. The illumination light has a predetermined illumination field of view. The method also includes detecting light from the target object within an imaging field of view through an imaging lens arrangement with an imaging sensor having photosensitive elements at least during a time period when the target object is illuminated by the illumination light, in which the imaging sensor is configured to output image data from the photosensitive elements. The method further includes processing and decoding the image data sampling an image of a barcode of the target object projected on the imaging sensor.

In some implementations, said directing light includes collimating the light from the illumination light source towards the second surface of the illumination lens to generate the illumination light. In some implementations, the predetermined illumination field of view is rectangular in shape.

In some implementations, the microlens array includes at least 200 micro lenses, and the method further includes projecting light received from the first Fresnel surface with each of the at least 200 micro lenses into a corresponding field of view that overlaps with the predetermined illumination field of view by at least 90%. In some implementations, the predetermined illumination field of view can be rectangular in shape.

In some implementations, the microlens array includes at least 200 micro lenses, and the method further includes projecting light received from the first Fresnel surface with each of the at least 200 micro lenses into a corresponding field of view that is substantially within the predetermined illumination field of view. In some implementations, the predetermined illumination field of view can be rectangular in shape.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an illumination light source;
an illumination lens comprising a first Fresnel surface facing the illumination light source and a second surface having a microlens array thereon, the first Fresnel surface configured to direct light received from the illumination light source towards the second surface to generate illumination light towards a target object through the microlens array on the second surface, the illumination light having a predetermined illumination field of view;
an imaging lens arrangement;
an imaging sensor having photosensitive elements configured to detect light from the target object within an imaging field of view through the imaging lens arrangement at least during a time period when the target object is illuminated by the illumination light, wherein the imaging sensor is configured to output image data from the photosensitive elements;
a controller configured for processing the image data to decode an image of a barcode on the target object; and
wherein the first Fresnel surface is configured to collimate light from the illumination light source towards the microlens array on the second surface of the illumination lens with the microlens array configured to broadening an apparent light source to create uniform chip image.

2. The apparatus of claim 1, wherein the illumination light source is located at a focus position of the first Fresnel surface to collimate light from the illumination light source towards the second surface of the illumination lens.

3. The apparatus of claim 1, wherein the first Fresnel surface having a focus length at least 5 mm.

4. The apparatus of claim 1, wherein the microlens array is arranged in a matrix of M rows and N columns, with the integer M being at least 5 and the integer N being at least 5.

5. The apparatus of claim 1, wherein the microlens array includes at least 25 micro lenses each having a focus length at least 0.5 mm.

6. The apparatus of claim 1, wherein at least 25 rectangular micro lenses arranged in a rectangular pattern.

7. The apparatus of claim 1, wherein at least 25 hexagonal micro lenses arranged in a hexagonal pattern.

8. The apparatus of claim 1, wherein the microlens array includes at least 25 micro lenses each projecting light received from the first Fresnel surface into a corresponding field of view that is rectangular in shape.

9. The apparatus of claim 1, wherein the predetermined illumination field of view is rectangular in shape.

10. The apparatus of claim 1, wherein the predetermined illumination field of view is hexagonal in shape.

11. The apparatus of claim 1, wherein the microlens array includes at least 25 micro lenses wherein multiple micro lenses each project light received from the first Fresnel surface into a corresponding field of view that overlaps with the predetermined illumination field of view by at least 90%.

12. The apparatus of claim 1, wherein the microlens array includes at least 25 micro lenses wherein multiple micro lenses each project light received from the first Fresnel surface into a corresponding field of view that substantially within with the predetermined illumination field of view.

13. A method comprising:
projecting light from an illumination light source onto a first Fresnel surface of an illumination lens;
directing the light received from the illumination light source by the first Fresnel surface towards a second surface of the illumination lens to generate illumination light towards a target object through a microlens array on the second surface, the illumination light having a predetermined illumination field of view;
detecting light from the target object within an imaging field of view through an imaging lens arrangement with an imaging sensor having photosensitive elements at least during a time period when the target object is illuminated by the illumination light, wherein the imaging sensor is configured to output image data from the photosensitive elements; and
processing and decoding the image data sampling an image of a barcode of the target object projected on the imaging sensor; and
collimating the light from the illumination light source towards the microlens array on the second surface of the illumination lens to generate the illumination light with the microlens array configured to broadening an apparent light source to create uniform chip image.

14. The method of claim 13, wherein the predetermined illumination field of view is rectangular in shape.

15. The method of claim 13, wherein the microlens array includes at least 25 micro lenses, the method further comprising:
projecting light received from the first Fresnel surface with each of the at least 25 micro lenses into a corresponding field of view that overlaps with the predetermined illumination field of view by at least 90%.

16. The method of claim 13, wherein the microlens array includes at least 25 micro lenses, the method further comprising:
projecting light received from the first Fresnel surface with each of the at least 25 micro lenses into a corresponding field of view that is substantially within the predetermined illumination field of view.

17. The method of claim 13, wherein the microlens array includes at least 25 micro lenses, the method further comprising:
projecting light received from the first Fresnel surface with each of the at least 25 micro lenses into a corresponding field of view that overlaps with the predetermined illumination field of view by at least 90%, wherein the predetermined illumination field of view is rectangular in shape.

18. The method of claim 13, wherein the microlens array includes at least 25 micro lenses, the method further comprising:
projecting light received from the first Fresnel surface with each of the at least 25 micro lenses into a corresponding field of view that is substantially within with the predetermined illumination field of view, wherein the predetermined illumination field of view is rectangular in shape.

* * * * *